United States Patent [19]

Kågström et al.

[11] Patent Number: 4,682,990
[45] Date of Patent: Jul. 28, 1987

[54] METHOD AND APPARATUS FOR CLEANING WATERY VENTILATING AIR CONTAINING LIQUIDS WHICH HAVE BEEN GASIFIED DURING COOLING OR LUBRICATION OF CONVERTING MACHINES, PARTICULARLY ROLLING MILLS

[75] Inventors: Per-Olof Kågström; Lars Abrahamsson, both of Finspång, Sweden

[73] Assignee: Gränges Aluminium Aktiebolag, Lidingö, Sweden

[21] Appl. No.: 545,385

[22] PCT Filed: Jan. 28, 1983

[86] PCT No.: PCT/SE83/00030

§ 371 Date: Sep. 28, 1983

§ 102(e) Date: Sep. 28, 1983

[87] PCT Pub. No.: WO83/02569

PCT Pub. Date: Aug. 4, 1983

Related U.S. Application Data

[63] Continuation of Ser. No. 581,653, Feb. 21, 1984, abandoned.

[51] Int. Cl.⁴ ............................ B01D 5/00; F24F 3/14
[52] U.S. Cl. ................................................ 55/80; 55/269; 34/76; 34/77; 34/86; 165/3; 165/113; 165/909
[58] Field of Search ................... 34/73, 76, 77, 86; 55/80, 84, 85, 268, 269; 165/3, 909, 113

[56] References Cited

U.S. PATENT DOCUMENTS

| | | | |
|---|---|---|---|
| 1,189,711 | 7/1916 | Lummus | 34/77 |
| 1,371,914 | 3/1921 | Lewis et al. | 34/77 |
| 2,185,047 | 12/1939 | Weinstein | 165/3 |
| 2,367,487 | 1/1945 | Desetti et al. | 34/77 |
| 2,663,950 | 12/1953 | Dinley | 34/77 |
| 2,691,830 | 10/1954 | Karnofsky | 34/77 |
| 3,118,741 | 1/1964 | Faulk | 34/76 |
| 3,131,035 | 4/1964 | Erickson | 34/77 |
| 3,800,505 | 4/1974 | Tarves, Jr. | 55/269 |
| 4,086,705 | 5/1978 | Wehr | 34/73 |
| 4,200,442 | 4/1980 | Willot | 55/269 |
| 4,292,744 | 10/1981 | Nabholz | 34/77 |
| 4,339,883 | 7/1982 | Waldmann | 34/76 |
| 4,424,633 | 1/1984 | Bernhardt et al. | 34/77 |
| 4,484,396 | 11/1984 | Darm | 34/77 |
| 4,484,451 | 11/1984 | Darm | 55/80 |

FOREIGN PATENT DOCUMENTS

| | | |
|---|---|---|
| 2414350 | 9/1979 | France ........................ 55/80 |
| 703476 | 3/1954 | United Kingdom . |
| 715316 | 9/1954 | United Kingdom . |

*Primary Examiner*—Albert W. Davis, Jr.
*Assistant Examiner*—John K. Ford
*Attorney, Agent, or Firm*—Spencer & Frank

[57] ABSTRACT

A method of cleaning watery i.e. humid, ventilating air containing liquids which have been gasified during cooling or lubrication of converting machines, particularly rolling mills, comprises cooling of the ventilating air in one or several stages to a temperature below the condensing point of the gasified substances in the ventilating air, so that these substances condense. In connection with the condensation, the larger portion of the condensed cooling or lubricating liquids is separated from the water and reused. The condensed water mixed with the rest of the condensed cooling and lubricating liquids is returned to the cleaned and dried ventilating air and is caused to be absorbed by the ventilating air. By dividing the cooling operation into two steps, the cooling and lubricating liquids can be caused to condense in the first stage without condensation of any water and water can be caused to condense substantially only in the second stage. A portion of the cooling and lubricating liquids condensed in the second stage are separated in a separation tank. An apparatus for carrying out the method comprises a plurality of heat exchangers. The first heat exchangers are used for cooling the ventilating air, and the following exchangers are used for heating the cleaned and dried ventilating air, so that this air can absorb the condensed water mixed with the rest of the cooling and lubricating liquids in a moistening device.

11 Claims, 1 Drawing Figure

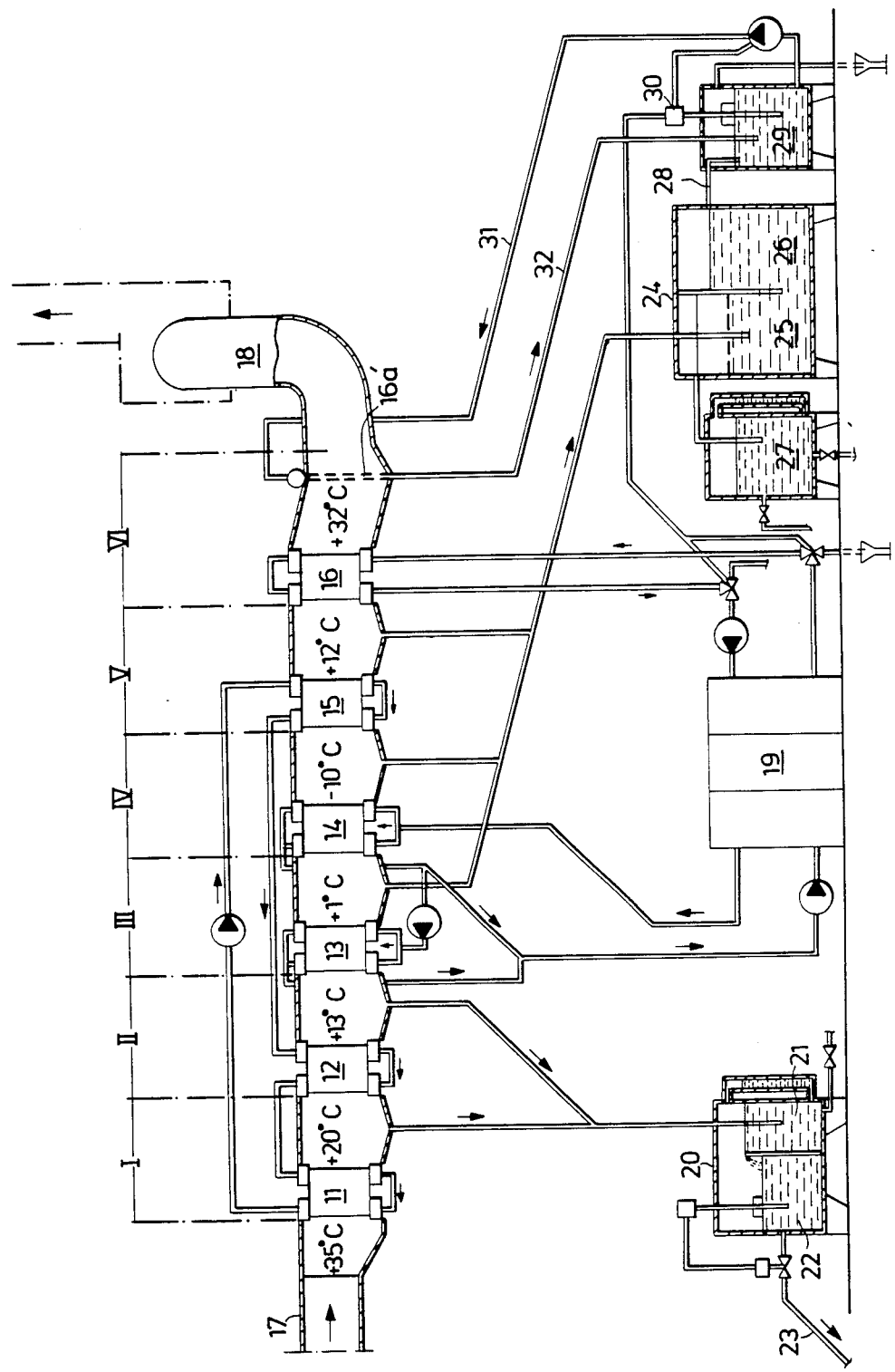

METHOD AND APPARATUS FOR CLEANING WATERY VENTILATING AIR CONTAINING LIQUIDS WHICH HAVE BEEN GASIFIED DURING COOLING OR LUBRICATION OF CONVERTING MACHINES, PARTICULARLY ROLLING MILLS

BACKGROUND OF THE INVENTION

1. Technical Field

The present invention is related to a method of cleaning watery i.e. humid ventilation air containing liquids which have been gasified during cooling or lubrication of converting machines. The method comprises cooling of the ventilating air in one or several steps to a temperature below the condensing point of the gasified substances in the ventilating air, so that said substances condense, and collecting the condensed liquids. The invention is also related to an apparatus for carrying out the method and is preferably intended for use in oil-cooled rolling mills or other oil- or liquid-cooled converting machines.

2. Background Art

In rolling mills, the rollers coming into contact with the ingots or metal billets to be rolled have to be forcefully cooled. This cooling is normally carried out by spraying an oil-based liquid over the rollers. During the cooling, large quantities of oil will be gasified and absorbed by the ambient air. For environmental reasons, this air has to be cleaned before it is released to the atmosphere or reused. The air quantities can be very large, e.g. of the order of 50,000 m$^3$/h.

The polluted air periodically contains, in addition to oil, large quantities of water due to changes in atmospheric humidity. When cleaning the air by conventional cooling in order to condense the gasified oil, large quantities of water will also condense e.g. of the order of 40 m$^3$ per 24 hours at 100,000 m$^3$/h, as the air has to be cooled to a comparatively low temperature to obtain a sufficient cleaning of the air. While a large portion of the condensed oil can be separated from the water comparatively easily and reused, a certain quantity of condensed oil will remain in the condensed water. It is very time consuming and expensive to separate the oil completely from the water. The quantity of oil remaining in the water after an economically justified separation of oil and water is so large that the water should not be released to a municipal facility without further cleaning. The cleaning of ventilating air containing oil and water thus presents a problem that is difficult to solve in an economically satisfactory way due to the large quantities of water containing oil that are obtained.

SUMMARY OF THE INVENTION

The main object of the invention is to provide a method and an apparatus for cleaning watery humid ventilating air that is mixed up with gasified cooling or lubricating liquids, with the main portion of the used cooling or lubricating liquids being recovered for reuse and the water being capable of being disposed of in a way that does not involve any disadvantages from an environmental point of view and that is satisfactory also from an economical point of view. The above object is achieved according to the invention by a method of cleaning watery ventilating air containing cooling or lubricating liquid which have been gasified during cooling or lubrication of converting machines, particularly rolling mills, which method comprises: cooling the ventilating air in at least one stage to a temperature below the condensing point of the gasified cooling or lubricating liquids and of the water in the ventilating air so that the gasified liquids and the water contained in the ventilating air condense; collecting the condensed cooling or lubricating liquids and the condensed water; separating at least a substantial portion of the condensed cooling or lubricating liquids from the water; and returning the condensed water mixed with any remaining condensed cooling or lubricating liquids to the cleaned and dried ventilating air to cause same to be absorbed by the ventilating air.

According to the preferred embodiment of the invention, the cooling is carried out in at least two stages with only the cooling or lubricating liquids being condensed in the first stage and with the water and further quantities of cooling or lubricating liquids being condensed in a subsequent stage, and a substantial quantity of the condensed cooling or lubricating liquids are separated from the condensate from the subsequent stage before returning the water with any remaining cooling or lubricating liquids to the ventilating air stream for absorption.

Due to the fact that the condensed water mixed up with the rest of the condensed cooling and lubricating liquids are returned to and absorbed by the cleaned ventilating air, no complete separation of the cooling or lubricating liquids from the water is required. Neither is any extended cleaning of the water necessary. Therefore, the necessary separation can be performed in a comparatively simple way at a low cost. The water that is returned to the ventilating air can have a degree of pollution that makes a direct release of the water into the nature or into a municipal sewerage system impossible, but that does not entail any serious degree of pollution of the released or recirculated ventilating air. Due to the principle of returning the condensed water to the ventilating air, a liquid balance is obtained in the system and the cooling of the ventilating air can proceed much further than would have been possible otherwise. This results in a lower degree of pollution of the released or recirculated ventilating air than has been possible to obtain previously.

BRIEF DESCRIPTION OF THE DRAWING

The invention will now be described more in detail with reference to the accompanying drawing which schematically shows an oil recovering and air cleaning apparatus according to the invention.

DETAILED DESCRIPTION OF THE PREFERRED EMBODIMENT

The cleaning apparatus for ventilating air shown on the drawing comprises four cooling stages I-IV and two heating stages V-VI. Each one of the four cooling stages comprises a cooling device 11-14 that consists of a heat exchanging unit. Also the first heating stage V comprises a device 15 including heat exchanging units. The second heating stage VI comprises a device 16 including heat exchanging units and a moistener 16a. The separate stages are arranged serially and are passed in turn by the ventilating air to be cleaned. Thus, the ventilating air enters through the port 17 to the left in the FIGURE and passes out through the port 18 to the right in the FIGURE. The first two cooling stages I and II are connected with the first heating stage V, so that the heat removed from the ventilating air entering the first cooling stage I is used for heating the ventilating air in the first heating stage V. The third and fourth cooling stages III and IV are connected to a separate cooling machine 19 of any type. The second heating stage VI is heated by waste heat from the cooling machine 19.

The first two cooling stages I and II are further connected to a receptacle 20 having two separate compartments 21,22 for collecting the condensate formed in the two stages. The receptacle 20 is provided with a drain 23 for the collected condensates. The third and fourth cooling stages III and IV are further connected to a receptacle 24 having two communicating compartments 25,26 for collecting the condensates formed in these stages. A smaller separate collecting receptacle 27 is positioned adjacent the receptacle 24. One compartment 26 of the receptacle 24 is connected to a circulation receptacle 29 through a drain 28. The circulation receptacle 29 is provided with a level controlling float 30 and is in turn connected to the moistener 16a through a feeding conduit 31 and a return conduit 32.

The described apparatus operates in the following way for cleaning the ventilating air from, e.g., an oil-cooled rolling mill.

The moist air containing oil enters through the port 17 and then has a temperature around +35 degrees centigrade. In the first cooling stage I, the air is cooled to about +20 degrees centigrade, and in the second cooling stage II the air is cooled to about +13 degrees centigrade. These temperatures are below the condensing point of the gasified oil in the ventilating air but above the condensing point of water. Thus, in the first two cooling stages substantially only oil is condensed, and this oil is collected first in the compartment 21 to the right in the receptacle 20. When this compartment 21 has been filled up, the oil is collected in the left compartment 22. The wall between the two compartments then operates as a spillway, so that the water possibly condensed in the first two stages remains at the bottom of the first compartment 21 and can be drained off through a bottom valve. The collected oil is drained through the conduit 23 for reuse in the rolling mill. In the third cooling stage III, the air is cooled to about +1 degree centigrade, and in the fourth stage IV the air is cooled to about −10 degrees centigrade. These temperatures are below the condensing point of water. Therefore, in these two stages substantially water but also some remaining quantities of oil are condensed. The condensed water mixed up with oil is lead to the compartment 25 to the left in the receptacle 24, as shown in the FIGURE. This compartment 25 communicates at the bottom with the second compartment 26 in the receptacle 24, and the condensed water will therefore flow into the second compartment 26. However, the receptacle has such a large volume that the water in the two compartments 25,26 only flows slowly, so that the oil mixed up with the water to a large extent has time to separate from the water and rise to the water surface of the first compartment 25. The collected oil can be drained off to the collecting receptacle 27. The water flowing into the second compartment 26 still contains a certain quantity of oil, e.g., of the order of 50 g/m$^3$, and is therefore not suitable for releasing into a sewage disposal system. This water is drained off to the circulation receptacle 29. From the circulation receptacle the condensed water containing oil is fed to the moistener 16a, where the oil and the water are absorbed by the passing ventilating air which has been heated in the stages V and VI to +12 degrees centigrade and +32 degrees centigrade, respectively, and passes out through the port 18.

The level controlling float 30 of the circulation receptacle 29 detects the level of the water in the receptacle 29 and controls the heat supply to the heating device 16 in such a way that the heat supply increases, when the level in the circulation receptacle 29 is rising, so that the absorbing capacity of the air increases, and the heat supply decreases, when the level in the circulation receptacle 29 is falling. This will make sure, in an easy way, that the condensed water containing oil always will be absorbed by the ventilating air leaving the cleaning device with a minimum of heat supply.

Furthermore, the tubing system contains a number of pumps which have been indicated by circles surrounding an arrowhead without reference numerals.

Due to the fact that the condensed water is returned to the ventilating air, the temperature of the ventilating air in the cleaning apparatus can be reduced comparatively far, e.g. to −10 degrees centigrade, as in the above example. At this temperature, the ventilating air only comprises about 60 mg gasified oil per m$^3$ which is a very low value. If the temperature would be lowered to, e.g., 0 degree centigrade, the ventilating air would contain about 130 mg oil per m$^3$. At a temperature of +10 degrees centigrade the air would contain about 250 mg oil per m$^3$. The saturation curve for gasified oil in air thus falls rapidly with decreasing temperature. Because a portion of the oil in the condensed water can be collected in the collecting receptacle 27, the ventilation air leaving the described arrangement will contain only an acceptable quantity of oil even after the return to the air of the condensed water containing oil. Thus, the principle of the invention provides for a good cleaning of the ventilating air at a reasonable cost.

While only one embodiment of the apparatus according to the invention and only one application example have been described, it is obvious that many modifications are possible within the scope of the invention. The last cooling stage, in which the temperature is reduced to −10 degrees centigrade and therefore ice is formed, can be doubled to provide two parallel stages, so that one stage is in operation while ice is being removed from the parallel stage. The cooling temperatures in the separate stages can further be modified depending upon need and available cooling power. The separation of oil or any other cooling or lubricating liquid from the water can be performed in many different ways, so that, e.g., only one cooling stage will be needed. It is, however, very convenient to use at least two cooling stages having different temperatures, so that the used cooling or lubricating liquid can be deposited in one stage and the water substantially in a second stage, as described above, because this will considerably facilitate the recovery of the cooling or lubricating liquid. The supply of cooling and heating power, respectively, to the separate stages can also be provided in many ways. In this connection, heat pumps may be used to take up the waste heat appearing in the system. The number of cooling and heating stages can also be varied within wide limits upon need. In the winter for example, normally only one heating stage is required, and this stage can be supplied with heat from any of the preceding stages. In the summer, however, normally a second heating stage is required, which must be supplied with heat from the outside, to make it possible for the leaving ventilating air to absorb the condensed water.

What is claimed is:

1. A method of cleaning humid ventilating air containing cooling or lubricating liquids which have been gasified during cooling or lubrication of converting machines, particularly rolling mills, comprising: cooling the ventilating air in at least one stage to a temperature below the condensing point of the gasified cooling or lubricating liquids and of the water in the ventilating air so that said gasified liquids and said water contained in the ventilating air condense; collecting the condensed cooling or lubricating liquids and the condensed water; separating at least a substantial portion of the condensed cooling or lubricating liquids from said water; and returning the condensed water mixed with any remaining condensed cooling or lubricating liquids to the cleaned and dried ventilating air produced after said step of cooling to cause same to be absorbed by the ventilating air.

2. A method according to claim 1 wherein: said step of cooling includes: cooling the ventilating air in a first stage to a temperature below the condensing point of the gasified cooling or lubricating liquids but above the condensing point of water, so that substantially only the cooling or lubricating liquids condense in this stage, and subsequently cooling the ventilating air in a second stage to a temperature below the condensing point of water, so that water and further quantities of the cooling or lubricating liquids condense; said step of collecting includes separately collecting the condensate from said first and second stages; said step of separating includes removing a substantial portion of any condensed cooling or lubricating liquids mixed with the condensed water from the water collected from said second stage; and, the water including the remaining quantities of the cooling or lubricating liquids after said step of removing is said condensed water which is returned to the cleaned and dried ventilating air.

3. A method according to claim 1 or 2, wherein said ventilating air is cooled to at least about −10 degrees centrigrade in the last cooling stage.

4. A method according to claims 1 or 2 further comprising heating the cleaned and cooled ventilating air to a temperature sufficient to absorb the condensed water and the cooling or lubricating liquids mixed with the water.

5. An apparatus for cleaning humid ventilating air containing cooling or lubricating liquids which have been gasified during cooling or lubricating of converting machines, particularly rolling mills, said apparatus comprising: first means for cooling the ventilating air in at least one stage to a temperature below the condensing point of the gasified cooling or lubricating liquids and of the water in the ventilating air, so that said gasified liquids and said water contained in the ventilating air condense; second means for collecting the condensed cooling or lubricating liquids and condensed water; third means for separating at least a substantial part of the condensed cooling or lubricating liquids from the water; and fourth means for returning the condensed water mixed with any remaining condensed cooling or lubricating liquids to the cleaned and dried ventilating air downstream of said first means for cooling so that the condensed water mixed with any remaining condensed cooling or lubricating liquids is absorbed by the ventilating air.

6. An apparatus according to claim 5 wherein: said first means comprises a plurality of successive cooling devices including a first cooling device for cooling the ventilating air to a temperature below the condensing point of the gasified cooling or lubricating liquids but above the condensing point of the water, and a second cooling device for cooling the ventilating air to a temperature below the condensing point of the water; said second means includes fifth and sixth means for collecting the cooling or lubricating liquids condensed in said first cooling device and for collecting the water, including any further quantities of cooling or lubricating liquids mixed with the water, condensed in said second cooling device, respectively; said third means includes means for removing a substantial portion of the cooling or lubricating liquids in said sixth means from the water; and said fourth means comprises means for returning only the condensed water mixed with any remaining cooling or lubricating liquids in said sixth means to the cleaned and dried ventilating air.

7. An apparatus according to claim 6, wherein: said gasified cooling or lubricating liquids are oil; said sixth means comprises a receptacle having a large volume, in which the water containing oil is collected and maintained during such a long time period that at least a substantial portion of the oil has time to separate from the water and rise to the surface of the water; and said fourth means includes a moistener provided to receive the water including the unseparated remaining quantity of oil in said sixth means and to transfer the water including the remaining quantity of oil to the cleaned and dried ventilating air.

8. An apparatus according to claim 6 or 7, wherein a heating device is provided for heat supply to the cleaned ventilating air, in order to make the air capable of absorbing the condensed quantity of water.

9. An apparatus according to claim 8, wherein mean are provided for heat transfer from said first cooling device to the said heating device for the cleaned ventilating air.

10. An apparatus according to claim 9 wherein: a cooling machine is connected to said second cooling device; a further heating device is provided for heat supply to the cleaned ventilating air; and means are provided for supplying said further heating device with waste heat from said cooling machine.

11. An apparatus according to claim 8, further comprising: a circulation receptacle connected between said sixth means and said fourth means and into which the water containing any remaining oil is fed prior to being returned to said ventilating air by said fourth means; and control means for detecting the water level in said circulation receptacle for controlling the heat supplied to the ventilating air by said heating device depending on the water level in said circulation receptacle.

* * * * *